Patented Dec. 8, 1931

1,835,344

UNITED STATES PATENT OFFICE

WALTER SCHOELLER, OF BERLIN-CHARLOTTENBURG, HANS JORDAN, OF BERLIN-STEG-LITZ, AND REINHARD CLERC, OF BERLIN, GERMANY, ASSIGNORS TO SCHERING-KAHLBAUM A.-G., OF BERLIN, GERMANY

PRODUCTION OF ALKYLATED PHENOLS

No Drawing. Application filed June 29, 1928, Serial No. 289,323, and in Germany July 21, 1927.

Our invention refers to the manufacture of alkylated phenols.

The process of manufacture of this invention is by heating an alkyl ether of a phenol or a derivative thereof under pressure to an elevated temperature, in the presence, if desired, of a catalyst, it being understood that the invention deals with saturated alkyl groups. Under these conditions alkyl ethers of phenols undergo a transformation in such a manner that the alkyl migrates into the nucleus in the sense of the following formulæ:—

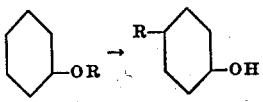

As secondary products are also obtained poly-substituted phenols in accordance with the following equation:—

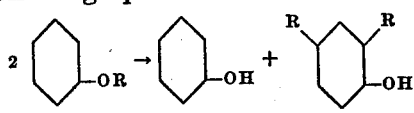

The process is suitably effected in such a manner that the ether in the presence, if desired, of contact masses having high porosity such as silica gel, fuller's earth or the like, is heated in an autoclave to the temperature necessary for the transformation. It is advantageous to employ an autoclave which allows of brisk working together of the materials to be treated, for example, by means of a stirring apparatus or by shaking of the autoclave.

The following examples illustrate the invention:—

Example 1

Phenyl-ethyl-ether is heated in a shaking autoclave to 280–320° C. After some hours the process is interrupted and para-ethyl-phenol is obtained together with small quantities of di-ethyl-phenol and phenol.

Example 2

The iso-propyl-ether of m-cresol is heated to 320–350° C. in a shaking autoclave in the presence of 10% of its weight of silica gel. Thereupon the pressure rises to about 60 atmospheres. After some hours the process is interrupted and there is obtained a mixture of 3-methyl-6-isopropyl-phenol (thymol) with 3-methyl-4-isopropyl-phenol from which the valuable thymol can be separated in the known manner.

Example 3

Phenyl-cyclohexyl-ether is treated as described in Example 2. Para-cyclohexyl-phenol is obtained.

The process can also be applied to derivatives of the phenol ethers as, for example, halogen derivatives, whereby the result can be attained that the alkyl-group migrating into the nucleus can be directed to a predetermined position.

Various changes may be made in the details disclosed in the foregoing specification without departing from the invention or sacrificing the advantages thereof.

In the following claims the term phenol is meant to cover also halogen or alkyl-derivatives of phenol.

We claim:

1. The process of producing an alkylated phenol with a saturated alkyl group comprising heating under pressure the ether of a phenol with a saturated aliphatic alcohol.

2. The process of producing an alkylated phenol with a saturated alkyl group comprising heating under pressure the ether of a phenol with a saturated aliphatic alcohol, in the presence of contact masses of high porosity.

3. The process of producing 3-methyl-6-isopropyl-phenol (thymol) comprising heating the iso-propyl-ether of meta-cresol under pressure.

4. The process of producing 3-methyl-6-isopropyl-phenol (thymol) comprising heating the iso-propylether of meta-cresol under pressure in the presence of contact masses having a high porosity.

WALTER SCHOELLER.
HANS JORDAN.
REINHARD CLERC.